United States Patent [19]

Hildebrand

[11] Patent Number: 5,069,920

[45] Date of Patent: Dec. 3, 1991

[54] ELECTRIC CONDUCTION COOKING METHOD

[76] Inventor: Victor F. Hildebrand, 10910 Shallowford Rd., Roswell, Ga. 30075

[21] Appl. No.: 528,068

[22] Filed: May 23, 1990

Related U.S. Application Data

[63] Continuation of Ser. No. 8,006, Jan. 29, 1987.

[51] Int. Cl.$^5$ ............................................. B65B 29/08
[52] U.S. Cl. ................................... 426/234; 426/244; 426/393; 219/10.81
[58] Field of Search .............. 426/107, 234, 113, 244, 426/393; 99/358, 451; 219/10.81

[56] References Cited

U.S. PATENT DOCUMENTS

| | | | |
|---|---|---|---|
| 645,569 | 3/1900 | Roberts | 99/451 |
| 1,617,692 | 2/1927 | Villar | 426/124 |
| 1,754,574 | 4/1930 | Sater | 426/244 |
| 1,961,681 | 6/1934 | Bohart | 426/234 |
| 2,013,675 | 9/1935 | Steerup | 426/107 |
| 2,182,383 | 12/1939 | Lang et al. | 426/234 |
| 2,423,915 | 7/1947 | Wacker | 53/440 |
| 3,230,861 | 1/1966 | Korr | 426/234 |
| 3,245,338 | 4/1966 | Korr | 426/107 |
| 3,311,285 | 3/1967 | Korr | 426/107 |
| 3,610,461 | 10/1971 | Allyn | 426/113 |
| 3,873,742 | 3/1975 | Miyahara | 426/407 |
| 3,965,323 | 6/1976 | Forker et al. | 219/10.55 E |
| 3,966,972 | 6/1976 | Theimer | 426/107 |
| 4,039,435 | 8/1977 | Narva | 426/86 |
| 4,089,982 | 5/1978 | Miyahara | 426/107 |
| 4,109,566 | 8/1978 | Vigerstrom | 426/107 |
| 4,137,333 | 1/1979 | Daswick | 426/113 |
| 4,177,719 | 12/1979 | Balaguer | 99/358 |
| 4,201,795 | 5/1980 | Yamanaka | 426/113 |
| 4,233,325 | 11/1980 | Slangan et al. | 426/113 |
| 4,496,594 | 1/1985 | Miyahara | 426/234 |
| 4,522,834 | 6/1985 | Miyahara | 426/107 |
| 4,612,199 | 9/1986 | Miyahara | 426/244 |
| 4,701,585 | 10/1987 | Stewart | 426/234 |

FOREIGN PATENT DOCUMENTS

| | | | |
|---|---|---|---|
| 767768 | 10/1971 | Belgium | 426/234 |
| 2100590 | 1/1983 | United Kingdom | 426/234 |

Primary Examiner—Steven Weinstein
Attorney, Agent, or Firm—Robert J. Van Der Wall

[57] ABSTRACT

The invention relates to a method of electrical conduction cooking of food in a package. The package includes two electrodes including a raised portion of the bottom wall and a planar top electrode and wherein the recessed area between the raised portion of the bottom wall and the sidewall of the package defines a peripheral reservoir. The food is cooked by passing electrical current through the food and allowing the drainage and accumulation of exuded products from the food product being cooked so as to prevent contamination of the bottom electrode.

11 Claims, 1 Drawing Sheet

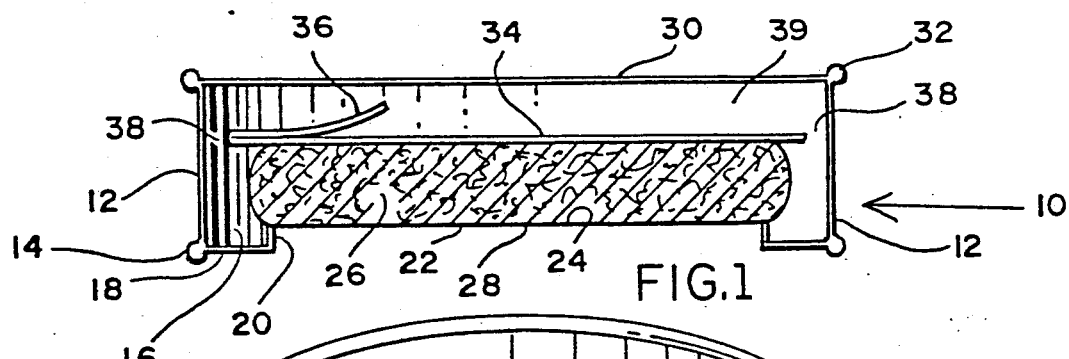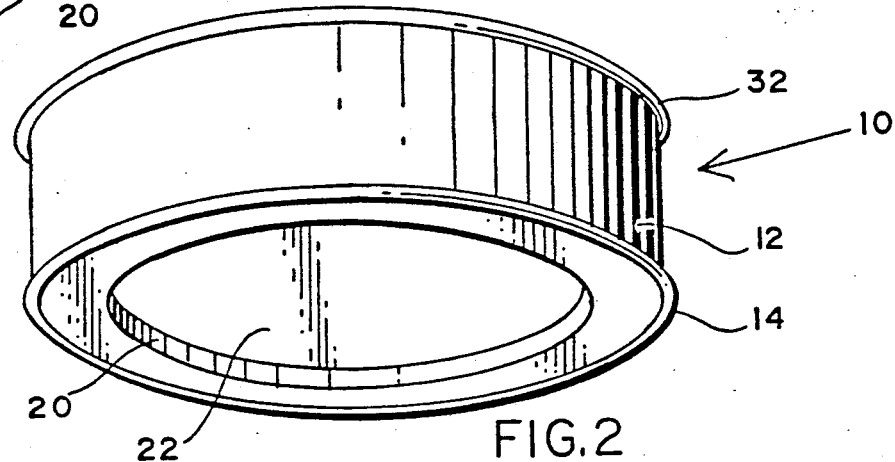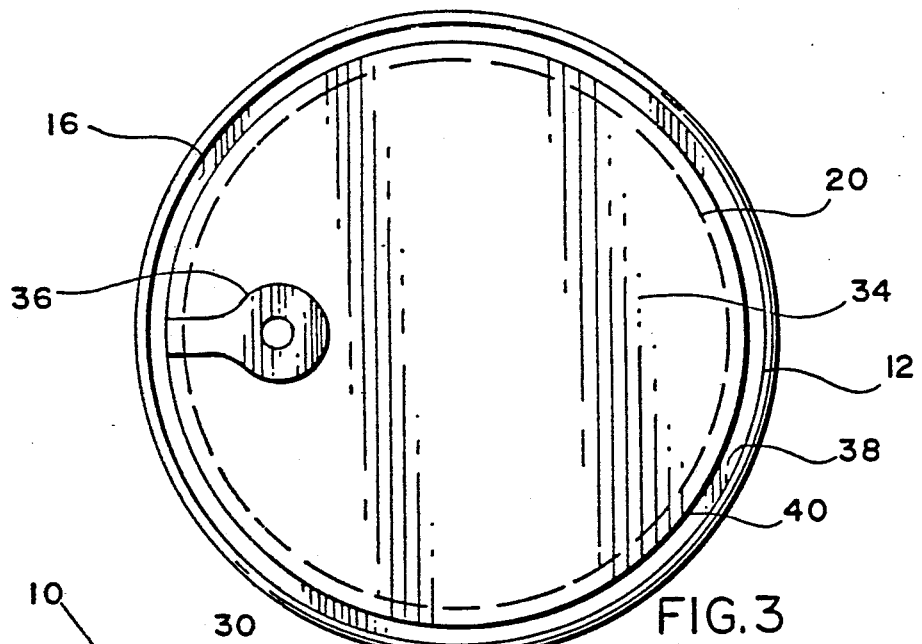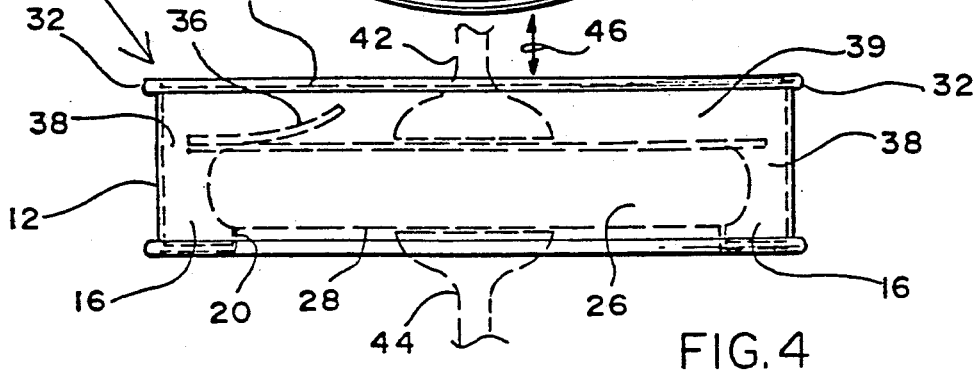

5,069,920

ELECTRIC CONDUCTION COOKING METHOD

CROSS REFERENCE TO RELATED APPLICATIONS

This application is a continuation of application Ser. No. 008,006 filed Jan. 29, 1987.

FIELD OF THE INVENTION

The present invention relates to the field of a method for the electric conduction cooking of food, i.e., cooking of food by passing an electrical current through the food itself to cook the same by resistance heating of same. More particularly, the present invention relates to a method which is made possible by a container in which such food is pre-packaged, cooked, and which may then be discarded and having electrodes which are integral with the package and discarded with same. The method contemplates consumption of the food immediately after cooking.

BACKGROUND OF THE INVENTION

Although far less frequently seen in actual practice than other methods of cooking, electric conduction cooking is well-established in the inventive literature and there are numerous patents covering apparatus and methods to accomplish the same. Obviously, these require an electrically conductive food substance or the addition of an electrolyte thereto. Many of the early efforts to achieve this type of cooking involve foods that were particularly well shaped to accommodate this means of cooking, frequently hotdogs. Some of the early art shows hotdogs which were pierced at each end by electrodes. Obviously, regardless of its geometric configuration, electrical resistance cooking of food required an electrically conductive food substance or immersion in one. Some of the more recent art has been directed to eliminating the necessity to pierce the food with electrodes which can disfigure and/or contaminate the food and has several safety ramifications as well. Since electrical conduction cooking of food necessarily implies some risk of a shock hazard, or worse, to human hands, safety considerations have been paramount in this art. Some of the art has also been adapted for use in vending machines where safety considerations can be minimized, and where the speed of electrical conduction cooking is particularly desirable. It is, of course, well-established that electrical conduction cooking is an extremely speedy means of cooking, and must be carefully controlled as a consequence. As a result of the speed with which electric conduction cooking is accomplished, it also represents an intriguing concept for the cooking of food to order in fast food restaurants. The tremendous proliferation of fast food restaurants in the United Sates and around the world has resulted in the application of scientific analysis and principles to improve the efficiency of cooking and serving fast food items, a frequent component of which is a hamburger patty. Most of present day fast food chains and franchises utilize either broiling or griddle-type cooking techniques involving thermal conduction to transmit cooking heat into the food. This technique is generally slower and less energy efficient than electrical conduction cooking. However, electrical conduction cooking has been plagued by several problems which the present invention addresses and solves.

Among these is the contamination of the cooking site in general and the electrodes in particular by the accumulation of fat and other fluids that are rendered from meat products during and after the cooking process. These fats and other fluids adversely affect electrical conductivity between the electrode and food, resulting in inconsistent reproducibility of cooking results, contamination of food, etc. In order to be successful, it has been determined that the food-contacting electrodes must be clean and the fats and other fluids resulting from cooking must be consistently removed. The present invention addresses both of these concerns by providing a novel method which is facilitated by a disposable cooking container in which is disposed a unique peripheral reservoir to accumulate fat and other fluids to be removed from the cooking site by being discarded. This cooking container also utilizes disposable electrodes as a portion of the container. That is, the electrodes are only used once and are discarded along with the structure of the disposable container with the collected fats and fluids remaining in the peripheral reservoir.

The cooking container is, in reality, a shipping enclosure in which the electrically conductive food is pre-packaged in intimate contact with the electrodes which form a part of the shipping enclosure. No electrolyte need be added to the food because it is electrically conductive already. The food can be frozen in place for shipping and storage and the container can be sealed for flavor retention and similar purposes during the shipping and storage process. The method contemplates immediate consumption of the food cooked in the container.

As noted above, there is substantial prior art in the electrical resistance cooking field. Among these are Electro-Food AB, Belgian Patent No. 797,768, which is a reference that broadly described processes and wrapping of food packages for sterilization and cooking. The reference, however, is clearly not directed to the single portion, immediate consumption, peripheral reservoir package purposes and means of the present invention.

One reference of considerable interest, although not in the electric conduction cooking field, is Daswick, U.S. Pat. No. 4,137,333, which describes in considerable detail a disposable package for cooking a prepared meat product. Daswick's package also teaches a built-in grease trap, filtered vent for cooking gasses, and a number of other features, but relates to heat conduction type cooking, as opposed to the electric conduction cooking of the present invention. Another reference of some interest is Forker. Jr.. et al., U.S. Pat. No. 3,965,323, which concerns a method and apparatus for microwave cooking and teaches a channel which is geometrically similar in some respects to the peripheral reservoir of the present invention. However, Forker. Jr., et al., does not teach the use of this channel for the purpose of maintaining electrically conductive contact with the food and is, at least to that extent non-analogous. A further interesting reference is Korr, U.S. Pat. No. 3,230,861, which teaches a food container adapted for use in electric conduction cooking. As with another reference by this same inventor (in combination with a co-inventor), this reference is geometrically distinguishable from the container that facilitates the present inventive method.

There are numerous U.S. patents in this art. Some of them are described hereinafter, while others are of record. Those discussed herein are examined from the standpoint of the container that facilitates the inventive method.

Of some interest in this respect is Bohart, U.S. Pat. No. 1,961,681, which is really directed to sterilization, teaches cooking under pressure, and is obviously not directed to immediate consumption of the food following the heating process. Three references are known to have been invented by Theimer, et al., U.S. Pat. Nos. 4,099,454; 3,966,972; and 3,886,290. The first of these discloses an electrical resistance cooking apparatus for cooking hotdogs. Although this reference provides a disposable cooking container, there is no reservoir for fats or other juices, the same being presumably absorbed by a bun that surrounds the hotdog. The contact tabs of the electrodes project from the container for contact with an electrical supply, and are not completely internal, as is the case with the present invention. Theimer, et al., '972, disclosed another electrical resistance cooking container which includes foil electrodes projection from the ends of the container rather than from the top. Theimer, et al., '290, is very much like their other references, except for a difference in the means of internal electrode contact. Theimer, et al., '454, recites numerous other references relating to this field, which are incorporated in this discussion by reference, but will not be individually reviewed. All of the Theimer, et al., references are certainly geometrically distinguishable from the present invention.

Other references known are Korr, et al., U.S. Pat. No. 3,842,724; Buckley, et al., U.S. Pat. No. 3,863,048; and Furgal, et. al., U.S. Pat. No. 3,062,663. Korr, et al., teaches a pre-packaged food in a container having electrodes for passing current through the food, but is also geometrically distinguishable and principally focuses on supplementary concerns including indicia relating to electrical conducting properties of the food, providing information in machines readable form regarding controlling of the electrical current and the like. Buckley teaches a complex apparatus utilizing spring biased contacts, penetrating elements, and is focused on circuitry, control and safety without fat or fluid retaining means by which the same can be accumulated and discarded. Furgal, et. al., relates to a disposable food packaging container with electrical resistance heating elements disposed therein, but is also geometrically dissimilar to the present invention and further lacks fat or fluid containment and disposal means.

On the other hand, Takeuchi, et. al., U.S. Pat. No. 4,320,276; and Palmer, et. al., U.S. Pat. No. 3,099,202, both teach electrical resistance food heating apparatus that does not include a disposable cooking container. Takeuchi, et. al., deals principally with the electrical circuitry concerns and controlling electrical conduction cooking.

Even less relevant references are those which employ thermal cooking mans, not the electrical conduction cooking at which the present cooking container invention is aimed. Such references include Marsh, et. al., U.S. Pat. No. 3,943,332; and Balaguer, et. al., U.S. Pat. No. 4,177,719. Marsh essentially teaches electrically heated plates which are mounted above and below the food to be cooked. Balaguer, on the other hand, places the food in contact with a sheet of conductive material, which sheet is then connected to an electrical power source, capable of supplying a low voltage high current. Thus, conduction is only in a typical conductor, such as metal, with the food being heated by reason of its proximity to such conductor.

Another reference, Lee, et. al., U.S. Pat. No. 3,167,431, recognizes the necessity for collection of fluids or fats that drain out of the food as it is cooked and should be collected. Lee provides a recess and openings into a collection receptacle. However, Lee does not disclose a disposable cooking container in which are located disposable electrodes. Another interesting reference is Anderson, et. al., which though not concerned with electric conduction cooking of food, also discloses a central depression to catch and hold grease drippings and other liquids. Anderson, of course, is concerned with portable grilling apparatus containing combustible fuel elements such as compressed charcoal briquettes for cooking purposes. It should be noted that Anderson teaches a series of small channels to allow fluids to flow to the centrally located depression. This technique will function only if the support for same is reasonably level and also if the small channels do not become clogged by bits of food, since fats and fluids must migrate from the most distant point to the center in order for the depression to be effective. A final reference of some interest is Lauth, et. al.. U.S. Pat. No. 1,380,656, which discloses an electric conduction oven using a mesh tray for holding food. Thus, the disposable container feature of the present invention is absent.

SUMMARY OF THE INVENTION

As previously described, a major problem encountered in the use of electrical resistance cooking is the draining and disposition of residual fats and fluids emitted by the food during the cooking process. In the present invention, a novel peripheral reservoir effectively eliminates such problems to such a degree that electrically conductive food, such as a hamburger, may be pre-packaged, stored and then quickly cooked, being efficiently drained of excess fat and other fluids by removal and disposal of the package forming the cooking container. There is thereby presented a palatable food with an attractive texture and without excessive fats or greases. The ever-present problem of quick and convenient disposal of such drained fats and fluids is resolved while at the same time in the body of the disposable container is placed cooking electrodes, pre-disposed in contact with the food, used only once, and discarded with the cooking container in a highly efficient manner. It is this cooking container that facilitates the method of the present invention, in which pre-packaged electrically conductive food in individual portions or servings is rapidly cooked for immediate consumption.

Accordingly, it is a primary object of the present invention to provide a rapid cooking method facilitated by a disposable cooking container that will retain all fats and fluids rendered from the food upon cooking, leaving food removed from that container well drained and more palatable for consumption. It is a further object of the present invention to provide a rapid cooking method facilitated by a method of food handling and cooking which takes advantage of a disposable cooking container that is compact and easy to use.

It is a still further object of the present invention to provide a method of food handling and cooking which takes advantage of a disposable cooking container that may be sealed while in storage to insure fresh flavor when the food contained therein is cooked.

One more important object of the invention is to provide a disposable cooking container that includes disposable cooking electrodes that may be discarded along with the container to avoid the necessity to clean such electrodes.

A collateral object of the invention is to insure uniformity in the cooking process by reason of pre-established effective contact between the electrodes and the food.

Another object of the invention is to avoid contamination of the food by piercing same, or by retained residue placed in contact with the food when the same is cooked by electrical conduction.

Still another object of the present invention is to provide a disposable cooking container that will minimize soiling of electrical apparatus employed in the use of electrical conductive cooking.

A further object of the invention is to provide a disposable cooking container which combines the feature of packaging economy, a cooking enclosure, the electrodes doubling as a portion of the package enclosure, and waste disposal, avoiding cooking device contamination, all in a highly simplified structure.

Still another object of the present invention is to provide an electrical resistance cooking container that provides features appealing for commercial fast food establishments and convenience stores, which at the same time providing a device equally suitable for the same purposes for home use.

Another object of the present invention is to provide a disposable cooking container that minimizes cleaning of associated electrical apparatus to reduce labor costs.

An important object of the invention is to reduce the time ordinarily required for cooking electrically conductive foods such as boneless meat, including but not limited to hamburgers, steaks, sausage, and hotdogs.

One more object of the invention is to eliminate the labor involved in the placement of food in contact with cooking devices, whether electrically conductive or not.

An important object of the invention is to provide an apparatus in the form of a food package which is simple, relatively inexpensive, convenient to use and produces reliable and consistent results in the electrical conduction cooking of food.

Other objects and advantages will be apparent to those skilled in the art.

In accordance with the invention there is provided a method enabling container in the general configuration of a flat cup which is normally round in shape. The sidewalls are comprised of a non-conductive material, preferably a plastic coated paper, or simply plastic, of appropriate low cost construction, but with appropriate flavor and moisture retention qualities.

The bottom of the disposable cooking container is comprised of a relatively thin conductor, usually sheet metal, and preferably aluminum. The bottom of the disposable cooking container is sealingly attached about its periphery to the sidewalls. The bottom is configured with a peripheral reservoir. This objective is achieved by stamping or otherwise forming the base with a raised center portion that has an upper surface which conforms to the shape of the food being cooked. Around this center portion is a recess which comprises the peripheral reservoir. The center portion is actually the bottom cooking electrode.

On top of the food to be cooked is placed the top cooking electrode, which is also a thin conductor, usually sheet metal, and preferably aluminum. The top electrode is simply a planar conductor having lateral dimensions which are slightly less than a distance between the sidewalls. Thus, if the container is round, the top electrode is simply a disk with a diameter that is slightly less than the diameter of the sidewalls. The purpose is so that the top electrode can pass freely between the sidewalls and come into intimate contact with the top of the food being cooked.

Attached to the upper surface of the top electrode is a lift out tab which provides a means to readily remove the top electrode immediately after cooking is completed. Directly above the top electrode, and in substantially parallel relation thereto, is located a removable sealing lid which forms the top portion of the shipping enclosure in which the food to be cooked is pre-packaged. The removable sealing lid is intended to flavor and moisture seal the food in the container for storage and shipping, and is removed immediately prior to cooking to allow electrical contact to be made between the top electrode and a power source. The removable sealing lid may be a plastic snap-on top, a heat shrink film or the like.

In accordance with a principal aspect of the present invention, there is provided a method of pre-packaging, storing cooking and serving food which is facilitated by the above container. The essential method of cooking and serving the food includes the steps of preparing food in a single portion for insertion into a food storage and cooking chamber of the above described container. Thereafter, said food is inserted and stored in a chamber disposed within the container, a top electrode that is later used for cooking is placed upon the top of the food in electrical contact therewith, and a removable lid to retain flavor and moisture qualities in the food is placed over the top of the food and top electrode. The container and food contained therein may then be frozen and stored, shipped and retained for rapid cooking with an apparatus provided by others.

When cooking is desired, the removable lid is detached from the container, and the same is placed in an apparatus that provides intimate electrical communication between an upper power source contacter in the top electrode and also intimate electrical communication between a lower power source contacter and bottom electrode. The food is thereby cooked, during which waste fat and other fluids are accumulated in the peripheral reservoir of the cooking container, which serves to optimize intimate electrical communication between the bottom electrode and the food.

Upon completion of the cooking, electrical communication between the power source and the electrodes of the container is terminated, and the top electrode can be removed from the top of the food storage and cooking chamber of the container so that the food may be withdrawn therefrom. The food which is preferably in a single portion can be withdrawn from the container and served for immediate consumption. The container with the food storage and cooking chamber and peripheral reservoir containing fluids rendered from the food by cooking is then discarded, thereby efficiently disposing of the waste.

The invention will be better understood upon reading the following detailed description of the preferred embodiment with reference to the appended drawings, in which:

BRIEF DESCRIPTION OF THE DRAWINGS

FIG. 1 is a side section view showing a cross-section of the container, the removable sealing lid, the top electrode with life out tab, container sidewalls and bottom cooking electrodes, into which is formed the peripheral reservoir.

FIG. 2 is a bottom perspective view of the container showing the preferably circular shape when the same is used for cooking hamburger patties and particularly illustrating the peripheral reservoir formed about the edge of the bottom electrode.

FIG. 3 is a top view of the container with the removable sealing lid discarded and showing the top electrode with lift out tab, which the inner wall of the peripheral reservoir illustrated in phantom.

FIG. 4 shows a side view of the cooking container during the cooking stage, with upper and lower power source contactors (supplied by others) and intimate electrical communication with the top and bottom electrodes and, of course, the removable sealing lid discarded.

DETAILED DESCRIPTION OF THE PREFERRED EMBODIMENT

FIG. 1 presents a cross-sectional side view of the disposable cooking container 10. The body of the disposable cooking container 10 may be round in configuration, and will ordinarily be round when the food to be cooked is a hamburger patty, but since the present invention is adaptable to cook other foods, its actual shape is a substantial variable depending upon the food to be cooked. For example, if the food to be cooked is one or more hotdogs or sausages, the container, in top view, could be rectangular or even square. Thus, the shape of the container is not significant with regard to the invention and the drawings showing it to be round are not to be construed as a limitation upon the invention.

The container 10 includes sidewalls which are comprised of a non-electrically conductive material, preferably a plastic coated paper, or simply plastic, or other appropriate low cost construction. Such material is selected with appropriate flavor and moisture retention qualities, since the disposable cooking container is also used as a shipping and storage enclosure in which the food to be cooked may be frozen and stored until needed.

The bottom of the disposable cooking container is comprised of a relatively thin electrical conductor, usually sheet metal, and is preferably aluminum. The bottom of the disposable cooking container is sealingly attached at 14, such as by crimping about the end of the sidewall 12. The bottom is configured with a peripheral reservoir 16 which reservoir is an annulus in the event that the disposable cooking container is round is shape. The peripheral reservoir 16 is actually comprised of a portion of the sidewall 12, a lower surface 18 and an inner wall 20. The peripheral reservoir is obtainable by stamping or otherwise forming the base 22 with a raised center portion which has an upper surface 24 which conforms to the shape of the food 26 which is pre-packaged in the container, stored, and cooked therein. The center portion of the base 22 is in reality the bottom electrode 28.

Also shown in FIG. 1 is the removable sealing lid 30. The removable sealing lid 30 forms the top of the container 10 for storage and shipping purposes, but must be discarded when the container is used for cooking the food 26. The removable sealing lid 30 may be a plastic snap-on top, in which event it has a lip 32 in close fitting relationship with sidewall 12 about the entire periphery of container 10. However, the removable sealing lid 30 may be of differing construction having the same purpose to flavor and moisture seal the food 26 in container 10, and thus may be comprised of a heat shrink film or the like. Removable sealing lid 30 is removed immediately prior to cooking to allow electrical contact to be made with a top electrode 34 disposed in substantially parallel relation to removable sealing lid 30 and located directly, but beneath same.

Top electrode 34 is placed directly over food 26 and in intimate contact therewith so that effective electrical communication between top electrode 34 and food 26 is achieved when power is applied between top electrode 34 and bottom electrode 28. Top electrode 34 is provided with a lift out tab 36. This provides a means to readily remove the top conductor immediately after cooking is completed since top electrode 34 may not only be difficult to grasp, but could be expected to be very hot, thus presenting an obstacle if manual removal is contemplated. It should also be noted that top electrode 34 is a substantially planar member having lateral dimensions that are slightly less than the distance between the sidewalls 12. Thus, an air gap 38 exists between the edge of the top electrode 34 and sidewall 12 which is important not only for easy removal of top electrode 34 following cooking, but allows the escape of vapors resulting from the cooking process. It will also be seen that the height of sidewall 12 is such that there exists a space 39 between sealing lid 30 and top electrode 34. This is to minimize any possibility that fats and other fluids rendered from the food being cooked will escape over the top of sidewall 12 and contaminate the environment around the container 10, such as the electrical apparatus in which said container 12 is placed for cooking (supplied by others).

Turning now to FIG. 2, a bottom perspective view of a circular embodiment of the inventive container 10 is illustrated. Sidewall 12 is crimped at 14 to base 22. The lower portion of sidewall 12 in combination with lower surface 18 and inner wall 20 form peripheral reservoir 16. Peripheral reservoir 16 surrounds bottom electrode 28. Lip 32 of the removable sealing lid, which is not visible in this view, is at the top of sidewall 12.

In FIG. 3, the invention is seen in top view absent the removable sealing lip 30 illustrated in FIG. 1. The outer circumference of the round embodiment of the invention pictured is sidewall 12, which is adjacent to air gap 38, air gap 38 is adjacent to the outer edge 40 of top electrode 34. Also shown in phantom is inner wall 20 of the peripheral reservoir 16. Also seen in one embodiment of lift out tab 36.

Turning finally to FIG. 4, the invention is shown in side view during the cooking process. Sidewall 12 surrounds all components heretofore described, which are shown in phantom as a consequence. Thus, in phantom is seen lift out tab 36, inner wall 20, top electrode 34, bottom electrode 28, food 26, peripheral reservoir 16 and air gap 38.

Also shown in FIG. 4 are upper power source contacter 42 and lower power source contacter 44, which are shown in phantom because they are furnished by others, and the shape thereof is not relevant to the container invention. Since intimate electrical communication must be achieved between upper power source contacter 42 and top electrode 34, and similarly between lower power source contacter 44 and bottom electrode 28, it is clear that the distance between the power source contacters 42 and 44 must be varied to insert and remove the invention and thus an arrow indicating such movement is also shown in phantom at 46.

While the invention has been described in connection with a preferred embodiment, it will be understood that there is no intention to thereby limit the invention. On the contrary, there is intended to be covered all alternatives, modification and equivalents as may be included within the spirit and scope of the invention as defined by the appended claims, which are the sole definition of the invention.

What is claimed is:

1. A method of electrical conduction cooking comprising:

preparing electrically conductive food in a single portion for insertion into a food storage and cooking chamber which is defined by sidewalls laterally circumscribing the food storage and cooking chamber, a bottom of which is comprised of an electrically conductive material having a raised center portion serving as a bottom electrode and further configured with a peripheral reservoir recessed from said center portion and interposed between said sealingly attached to both the sidewalls and center portion said reservoir being configured to allow drainage and accumulating of fat and other fluids exuded from said food during electrical conduction cooking away from said food and said bottom electrode;

inserting the electrically conductive food into the food storage and cooking chamber and onto said raised center portion above said reservoir so that said food is supported on and is in electrical contact with the bottom electrode;

placing a top electrode of electrically conductive material into the top of the food storage and cooking chamber and onto the food supported on said bottom electrode to provide electrical contact with the food, said top electrode being sized to be separated from the sidewalls to leave an air gap between said top electrode and said sidewalls;

attaching sealingly to the sidewalls above the top electrode a removable lid to seal the food in said storage and cooking chamber and thereby retain qualities of the food stored in the food storage and cooking chamber prior to cooking, said removable lid in combination with the top electrode and food storage and cooking chamber forming an electric conduction cooking container;

transporting the sealed electric conduction cooking container and food inserted therein to a cooking apparatus having an upper power source contacter and a lower power source contacter;

detaching from the sidewalls above the top electrode the removable lid;

establishing intimate electrical communication between the upper power source contacter and top electrode and also between the lower power source contacter and bottom electrode to send the electrical current through said food to cook, the food while accumulating in the peripheral reservoir and away from said food and bottom electrode, fats and other liquids exuded from the food by cooking to prevent the contamination of said bottom electrode by said exuded fats and other liquids and their adverse effects on the electrical conductivity between said bottom electrode and said food while optimizing intimate electrical communication between the bottom electrode and the food;

terminating intimate electrical communication between the upper power source contacter and top electrode and also between lower power source contacter and bottom electrode;

removing the top electrode from the top of the food storage and cooking chamber;

withdrawing the food thus cooked from the electrical conduction cooking container leaving said exuded fats and other liquids in the peripheral reservoir rendered from the food by cooking;

serving for immediate consumption said food in a single portion withdrawn from the electrical conduction cooking container; and discarding the electric conduction cooking container with peripheral reservoir containing said exuded fats and other liquids.

2. The method of claim 1, which, after attaching the removable lid, further comprises freezing the electric conduction cooking container and food disposed therein.

3. The method of claim 2 which further comprises storing the frozen container and food until consumption is demanded.

4. The method of claim 2 which further comprises shipping the frozen container and food to points of consumption.

5. The method of claim 4 wherein the points of consumption are fast food restaurants.

6. The method of claim 4 wherein the points of consumption are convenience stores.

7. A method of electrical conduction cooking comprising:

manufacturing a disposable electric conduction cooking container adapted for use with food to be placed later therein comprising a food storage and cooking chamber defined by sidewalls of an electrically insulating material, said sidewalls laterally circumscribing the food storage and cooking chamber, the bottom of which is comprised of an electrically conductive material having a raised center portion serving as a bottom electrode and further configured with a peripheral reservoir recessed from said center portion and interposed between and sealingly attached to both the sidewalls and center portion, said reservoir being configured to allow drainage and accumulating of fat and other fluid exuded from said food during electrical conduction cooking away from said food and said bottom electrode, said food storage and cooking chamber further defined by a top electrode of electrically conductive material to be placed upon the food and disposed within, but separated by an air gap from the sidewalls and a sealing lid for removable attachment to the sidewalls above the top electrode, said lid being capable of sealing the food in said container to retain qualities of food placed in the container;

shipping the container to a user;

preparing electrically conductive food in a single portion for insertion into the food storage and cooking chamber;

inserting the electrically conductive food into the food storage and cooking chamber and onto said raised center portion above said reservoir so that said food is supported on and is in electrical contact with the bottom electrode;

placing a top electrode of electrically conductive material into the top of the food storage and cooking chamber and onto said food supported on said bottom electrode to provide electrical contact with the food, said top electrode being sized to be separated from the sidewalls to leave an air gap between said top electrode and said sidewalls;

transporting the food storage and cooking chamber and food inserted therein to a cooking apparatus having an upper power source contacter;

establishing intimate electrical communication between the upper power source contacter and top electrode and also between the lower power source contacter and bottom electrode to send electrical current through said food to cook the food while accumulating in the peripheral reservoir and away from said food and bottom electrode, fats and other liquids exuded from the food by cooking to prevent the contamination of said bottom electrode by said exuded fats and other liquids and their adverse effects on the electrical conductivity between said bottom electrode and said food while maintaining electrical contact between the bottom electrode and the food;

terminating intimate electrical communication between the upper power source contacter and top electrode and also between the lower power source contacter and bottom electrode;

removing the top electrode from the top so the food storage and cooking chamber;

withdrawing the food thus cooked from the food storage and cooking chamber leaving said exuded fats and other liquids in the peripheral reservoir rendered from the food by cooking;

serving for immediate consumption, said food in a single portion withdrawn from the food storage and cooking chamber; and discarding the food storage and cooking chamber with peripheral reservoir containing said exuded fats and other liquids rendered from the food by cooking.

8. The method of claim 12 which, after placing the top electrode into the top of the food storage and cooking chamber, further comprises attaching sealingly to the sidewalls above the top electrode a removable lid to thereby retain qualities of the food stored in the food storage and cooking chamber prior to cooking, said removable lid in combination with the top electrode and food storage and cooking chamber, forming an electric conduction cooking container.

9. The method of claim 8 which, after attaching removable lid, further comprises freezing the electric conduction cooking container and food disposed therein.

10. The method of claim 9 which further comprises storing the frozen container and food until consumption is demanded.

11. The method of claim 8 which after attaching the removable lid to the sidewalls above the top of the electrode, further comprises detaching from the sidewalls above the top electrode the removable lid.

* * * * *